(12) United States Patent
Kim

(10) Patent No.: US 12,018,791 B2
(45) Date of Patent: Jun. 25, 2024

(54) SYSTEM FOR CIRCULATING AIR THROUGH DOUBLE PIPES FOR SUPPLYING GAS AND AIR CIRCULATION METHOD USING SAME

(71) Applicant: DAEWOO SHIPBUILDING & MARINE ENGINEERING CO., LTD., Geoje-si (KR)

(72) Inventor: Jong Hyun Kim, Geoje-si (KR)

(73) Assignee: Hanwha Ocean Co., Ltd., Geoje-si (KR)

(*) Notice: Subject to any disclaimer, the term of this patent is extended or adjusted under 35 U.S.C. 154(b) by 1096 days.

(21) Appl. No.: 16/622,755

(22) PCT Filed: Sep. 26, 2017

(86) PCT No.: PCT/KR2017/010595
§ 371 (c)(1),
(2) Date: Dec. 13, 2019

(87) PCT Pub. No.: WO2019/066090
PCT Pub. Date: Apr. 4, 2019

(65) Prior Publication Data
US 2020/0208771 A1 Jul. 2, 2020

(51) Int. Cl.
*F16L 59/06* (2006.01)
*B63B 25/16* (2006.01)
(Continued)

(52) U.S. Cl.
CPC .............. *F16L 59/06* (2013.01); *B63B 25/16* (2013.01); *F16L 59/141* (2013.01); *F17C 13/12* (2013.01);
(Continued)

(58) Field of Classification Search
CPC .... F16L 59/06; F17D 5/04; F17C 2270/0105; F17C 2221/033; F17C 2205/0352;
(Continued)

(56) References Cited

U.S. PATENT DOCUMENTS 4,718,251 A * 1/1988 Thornton .................. F25B 9/02
62/500
2016/0314225 A1* 10/2016 Gonzales ................ E21B 41/00

FOREIGN PATENT DOCUMENTS

| CN | 101007565 A | 8/2007 |
|---|---|---|
| CN | 101622651 A | 1/2010 |

(Continued)

OTHER PUBLICATIONS

KR20150109700A Translation (Year: 2015).*
(Continued)

*Primary Examiner* — Schyler S Sanks
(74) *Attorney, Agent, or Firm* — Knobbe, Martens, Olson & Bear, LLP

(57) ABSTRACT

A system for circulating air through double pipes for supplying gas, includes double pipes connected to a gas handling device and supplied with gas; a gas supply unit for supplying gas to the gas handling device through an inner pipe of the double pipes; an air supply unit for supplying air through an outer pipe of the double pipes; and an air suctioning means for suctioning and circulating the air, which is supplied to the outer pipe by the air supply unit, by the introduction of a high pressure fluid. Rather than circulating air through the outer pipe of the double pipes by a fan, air can be circulated through the double pipes for gas supply by a simpler structure and more effective configuration.

15 Claims, 3 Drawing Sheets

(51) Int. Cl.
  *B63H 21/38* (2006.01)
  *F16L 59/14* (2006.01)
  *F17C 13/12* (2006.01)
  *F17D 5/00* (2006.01)
  *F17D 5/04* (2006.01)

(52) U.S. Cl.
  CPC ...... *B63H 21/38* (2013.01); *F17C 2205/0352* (2013.01); *F17C 2221/033* (2013.01); *F17C 2270/0105* (2013.01); *F17D 5/005* (2013.01); *F17D 5/04* (2013.01)

(58) Field of Classification Search
  CPC ..... F17C 13/12; F02M 21/0293; B63H 21/38; B63B 17/0036; B63B 25/16
  See application file for complete search history.

(56) References Cited

FOREIGN PATENT DOCUMENTS

| CN | 102574563 A | 7/2012 |
|---|---|---|
| CN | 104736432 A | 6/2015 |
| JP | 4-163270 A | 6/1992 |
| JP | 2001-141272 A | 5/2001 |
| JP | 2011-79381 A | 4/2011 |
| JP | 2011-079381 A | 4/2011 |
| KR | 10-2009-0007272 A | 1/2009 |
| KR | 10-2010-0088215 A | 8/2010 |
| KR | 10-2011-0023484 A | 3/2011 |
| KR | 10-1320890 B1 | 10/2013 |
| KR | 10-2015-0109700 A | 10/2015 |
| KR | 20150109700 A * | 10/2015 |
| KR | 10-2017-0111447 A | 10/2017 |
| KR | 10-2017-0111449 A | 10/2017 |
| NO | 20111201 A1 | 3/2013 |
| WO | 2011/043146 A1 | 4/2011 |
| WO | 2016/097460 A1 | 6/2016 |
| WO | 2017/074261 A1 | 5/2017 |

OTHER PUBLICATIONS

Office Action of Japanese Patent Application No. 2019-569412—10 pages (dated Jan. 5, 2021).
International Search Report of corresponding PCT Application No. PCT/KR2017/010595—4 pages (dated Feb. 28, 2018).
The First Office Action of Chinese Patent Application No. 201780091989.3—15 pages (dated Apr. 1, 2021).
Extended European Search Report of European Patent Application No. 17926889.1-9 pages (dated Apr. 8, 2021).
Written Opinion of Singaporean Patent Application No. 11201912006T—6 pages (dated Apr. 19, 2021).

* cited by examiner

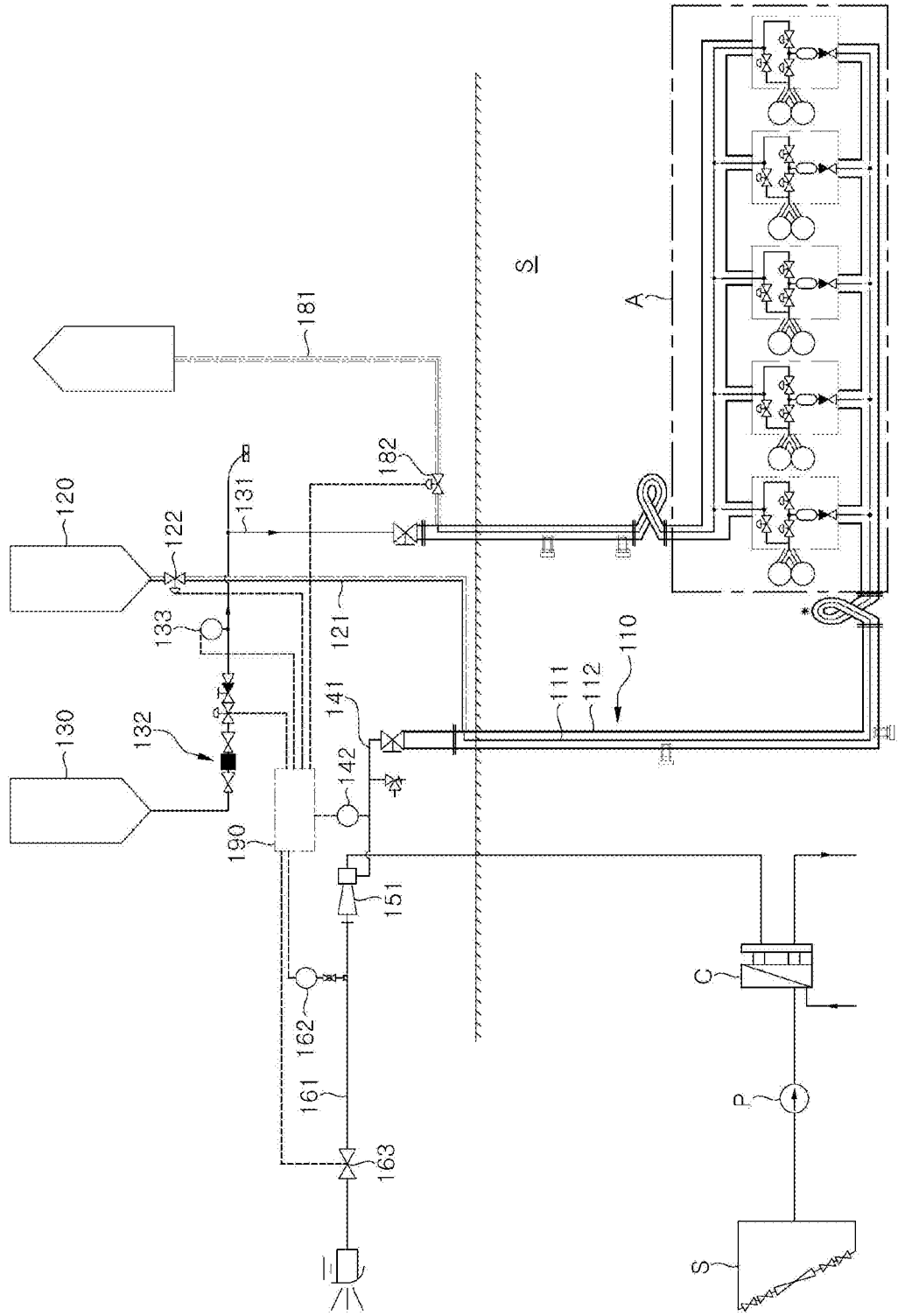
[FIG. 1]

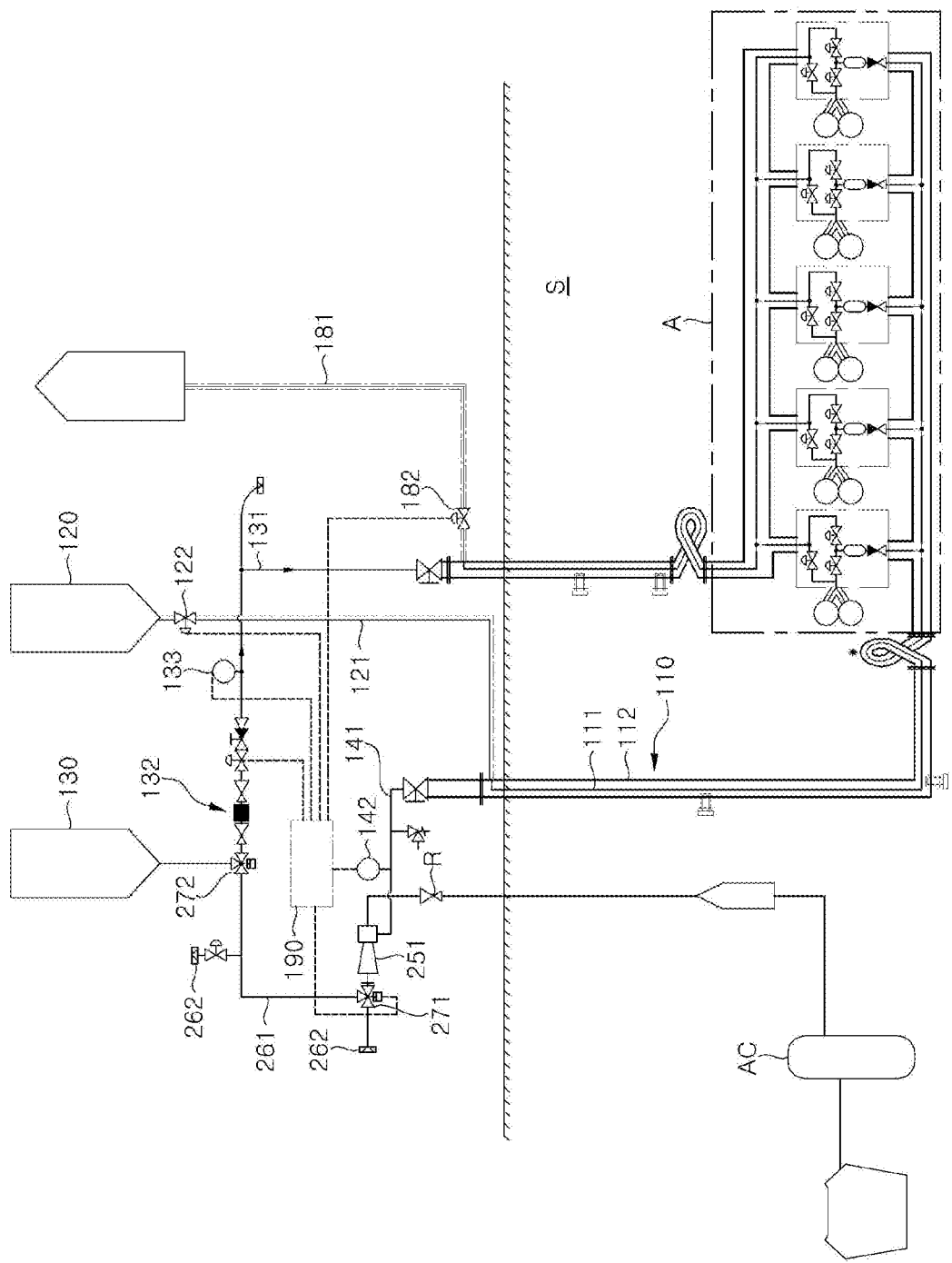
[FIG. 2]

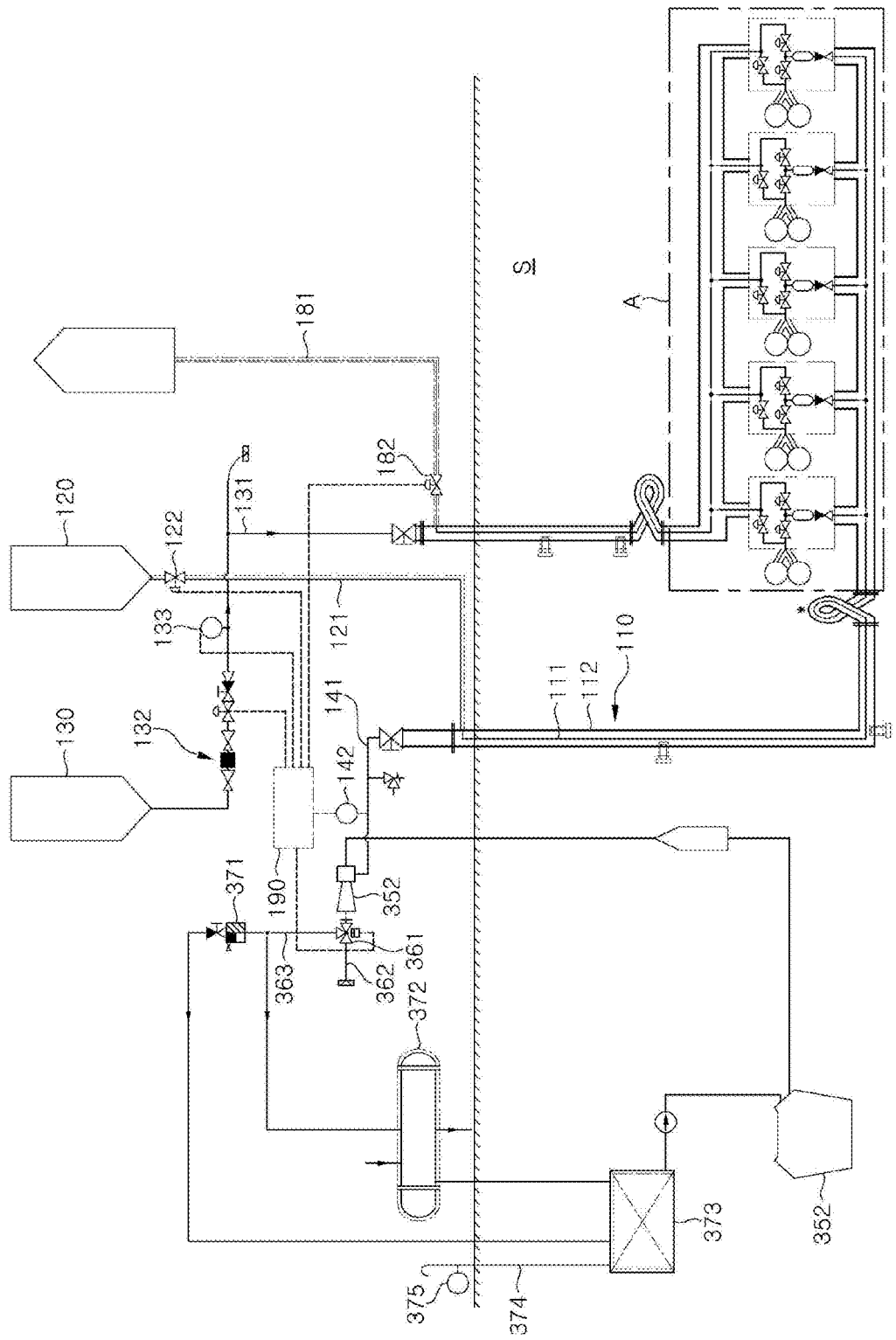
[FIG. 3]

SYSTEM FOR CIRCULATING AIR THROUGH DOUBLE PIPES FOR SUPPLYING GAS AND AIR CIRCULATION METHOD USING SAME

TECHNICAL FIELD

The present invention relates to a system for circulating air through a double-walled pipe for supplying a gas that can cause safety risks upon leakage, such as LNG, and an air circulation method using the same.

BACKGROUND ART

In ships and offshore structures that handle safety-critical gases, such as LNG, a double-walled pipe is used to prevent leakage of LNG.

Particularly, ships and offshore structures equipped with a boil-off gas reliquefaction apparatus or a high-pressure natural gas injection engine such as an ME-GI engine employ a double-walled pipe having a double leakage prevention structure so as to prevent leakage of LNG into a safety zone (for example, an engine room) where such an apparatus is disposed, whereby, even when LNG leaks from an inner pipe of the double-walled pipe, an outer wall of the double-walled pipe can prevent further LNG leakage.

During operation of an engine, air is continuously circulated through the outer pipe, wherein it is necessary to exchange the air with dry air 30 times per hour to detect gas leakage and corrosion/contamination due to condensate water.

The circulated air is then discharged to the outside of a ship or to an area where there is no danger of fire.

Conventionally, in order to circulate air through the outer pipe of the double-walled pipe, a fan that generates dry air, supplies the air to the outer pipe of the double-walled pipe, and suctions the air from the outer pipe to circulate the air has been used.

However, such a fan for air circulation has drawbacks of high cost and high power consumption.

In addition, since the fan is an electrical device, an explosion proof design is required therefor.

DISCLOSURE

Technical Problem

Embodiments of the present invention have been conceived to solve such a problem in the art and it is an aspect of the present invention to provide a system for circulating air through a double-walled gas supply pipe, which can circulate air through an outer pipe of the double-walled gas supply pipe in a simpler and more efficient configuration than typical fan-based air circulation systems, and an air circulation method using the same.

Technical Solution

In accordance with one aspect of the present invention, there is provided a system for circulating air through a double-walled gas supply pipe, the system including: a double-walled pipe connected to a gas handling device to deliver a gas to the gas handling device; a gas supply unit supplying the gas to the gas handling device through an inner pipe of the double-walled pipe; an air supply unit supplying air to an outer pipe of the double-walled pipe; an air discharge line for discharging the air circulated from the outer pipe; and an air suction unit connected to the air discharge line and adapted to suction and circulate the air supplied to the outer pipe from the air supply unit using a high-pressure fluid introduced thereinto.

In a first embodiment, the air suction unit may be a water ejector adapted to suction the air from the outer pipe using high-pressure water introduced thereinto and the system may further include a first discharge line for discharging the water introduced into the water ejector to an outside of a ship including the system.

In the first embodiment, the system may further include: a pressure gauge disposed on the first discharge line to measure discharge pressure through the first discharge line; and a control valve disposed on the first discharge line and controlled based on a pressure value measured by the pressure gauge.

The water introduced into the water ejector may be water supplied from a sea chest and having been used to cool coolant water.

In a first embodiment, the air suction unit may be an air ejector adapted to suction the air from the outer pipe using high-pressure air introduced thereinto and the system may further include a second discharge line for discharging the air introduced into the air ejector.

The second discharge line may be connected to an air supply line for delivering the air from the air supply unit to the outer pipe to allow the air discharged through the second discharge line to be circulated to the outer pipe through the air supply line such that air circulation to the outer pipe is achieved without additional air supply from the air supply unit.

Upon detection of gas leakage into the outer pipe, air circulation from the second discharge line to the air supply line is shut off and the air supply unit is controlled to resume air supply to the outer pipe.

In a third embodiment, the air suction unit may be a steam ejector adapted to suction the air from the outer pipe using high-pressure steam introduced thereinto, and the system may further include: a steam supply device producing steam and supplying the steam to the steam ejector; a condensate water circulation line branched off downstream of the steam ejector to be connected to the steam supply device; and a third discharge line branched off downstream of the steam ejector to discharge the steam and the gas from a ship including the system.

Under normal circumstances, the steam introduced into the steam ejector may be supplied back to the steam supply device through the condensate water circulation line, and, upon occurrence of gas leakage into the outer pipe, the steam introduced into the steam ejector may be discharged together with the leaked gas through the third discharge line.

The condensate water circulation line and the third discharge line may be branched off of each other via a three-way valve disposed downstream of the steam ejector.

The steam introduced into the steam ejector may be converted into condensate water and sent to a cascade tank through the condensate water circulation line to be temporarily stored in the cascade tank, wherein the cascade tank may be formed with a venting line through which the leaked gas is discharged.

In the third embodiment, the system may further include a gas detector disposed on the air discharge line to detect leakage of the gas.

In the first to third embodiments of the present invention, the system may further include: a gas purging line connected to the double-walled pipe to discharge the gas leaking into the outer pipe; and a controller controlling gas supply from the gas supply unit and air supply from the air supply unit, detecting the gas leaking from the double-walled pipe, and discharging the leaked gas through the gas purging line.

In accordance with another aspect of the present invention, there is provided a method of circulating air through a double-walled gas supply pipe.

In one embodiment, the method includes: supplying, by an air supply unit, air to an outer pipe of the double-walled gas supply pipe; suctioning, by an air ejector, the air in the outer pipe toward an air discharge line through introduction of high-pressure air into the air ejector; discharging the air introduced into the air ejector through a second discharge line; and circulating the air discharged through the second discharge line to the outer pipe, wherein air circulation to the outer pipe is achieved without additional air supply from the air supply unit by circulating the air introduced into the air ejector and having been discharged through the second discharge line to the outer pipe.

In this embodiment, the method may further include, upon detection of gas leakage into the outer pipe, shutting off air circulation from the second discharge line to the outer pipe while controlling the air supply unit to resume air supply to the outer pipe.

In another embodiment, the method includes: supplying, by an air supply unit, air to an outer pipe of the double-walled gas supply pipe; suctioning, by a steam ejector, the air in the outer pipe toward an air discharge line through introduction of high-pressure steam into the steam ejector; and discharging the steam introduced into the steam ejector, wherein, under normal circumstances, the steam introduced into the steam ejector is discharged to a condensate water circulation line and, upon occurrence of gas leakage into the outer pipe, the steam introduced into the steam ejector is discharged together with the leaked gas to an outside of a ship employing the method through a third discharge line.

The steam introduced into the steam ejector may be produced by a steam supply device provided to the ship or the offshore structure.

In this embodiment, the method may further include: converting the steam discharged to the condensate circulation line from the steam ejector into condensate water; and supplying the condensate water back to the steam supply device.

In this embodiment, the method may further include temporarily storing the condensate water in a cascade tank, wherein the cascade tank is formed with a venting line through which the leaked gas is discharged.

In the above embodiments, the method may further include, upon detection of gas leakage into the outer pipe, shutting off gas supply to an inner pipe of the double-walled gas supply pipe while discharging the leaked gas through a gas purging line connected to the double-walled gas supply pipe.

Advantageous Effects

Embodiments of the present invention provide a system for circulating air through a double-walled gas supply pipe, which can operate in a simpler configuration than typical air circulation systems using a high-cost fan, and an air circulation method using the same.

In one embodiment, a water ejector, which does not require a separate power supply and is easy to maintain, is used as an air suction unit. In addition, water used in the water ejector can be supplied from a sea water cooling system essential for existing ships, thereby allowing a more efficient system configuration.

According to another embodiment in which an air ejector is used as an air suction unit, air supplied to the air ejector for air circulation through the double-walled pipe can be circulated through the double-walled pipe, thereby allowing a simpler and more efficient system configuration.

According to a further embodiment in which a steam ejector is used as an air suction unit, an existing steam circulation system can be used to supply steam to the steam ejector, thereby allowing a resource efficient and easy-to-maintain system configuration. Further, since the steam supplied to the steam ejector for air circulation is supplied back to the steam supply device, more efficient resource use is possible.

Further, according to the present invention, any of the aforementioned ejectors can be configured in a multistage manner, thereby allowing flexible design change depending on desired capacity.

Furthermore, according to the present invention, even when gas leaks from an inner pipe of the double-walled pipe, the gas leak is safely monitored and controlled to allow the leaking gas to be safely discharged, thereby allowing a safer system configuration.

DESCRIPTION OF DRAWINGS

FIG. 1 is a block diagram of an air circulation system according to a first embodiment of the present invention.

FIG. 2 is a block diagram of an air circulation system according to a second embodiment of the present invention.

FIG. 3 is a block diagram of an air circulation system according to a third embodiment of the present invention.

BEST MODE

The above and other aspects, features, and advantages of the present invention will become apparent from the detailed description of the following embodiments in conjunction with the accompanying drawings.

FIG. 1 is a block diagram of an air circulation system according to a first embodiment of the present invention.

Now, the air circulation system according to the first embodiment will be described with reference to FIG. 1.

The air circulation system according to the first embodiment is a system for circulating air through a double-walled pipe used in a ship or an offshore structure handling a gas such as LNG.

The air circulation system includes a double-walled pipe 110, a gas supply unit 120, an air supply unit 130, and an air suction unit.

The double-walled pipe 110 has a double structure of an inner pipe 111 and an outer pipe 112 to ensure safe delivery of the gas or the like, which can cause safety risks upon leakage, and is disposed in a safety zone S provided with a gas handling device A.

The gas handling device A is a device that treats the gas or uses the gas as a fuel, and may be, for example, a reliquefaction device or an ME-GI engine. In this embodiment, the gas handling device A will be exemplified by an ME-GI engine, wherein the safety zone S is an engine room provided with the ME-GI engine.

The gas supply unit 120 supplies the gas to the gas handling device A through a gas supply line 121, wherein the gas supply line 121 is connected to the double-walled pipe 110 to deliver the gas to the gas handling device A through the inner pipe 111 of the double-walled pipe.

The gas supply line 121 is provided thereon with a master gas valve 122 adapted to turn on or shut off supply of the gas under the control of a controller 190.

Air is circulated through the outer pipe 112 to protect the inner pipe 111 and to detect leakage of the gas. Here, the air is supplied from the air supply unit 130.

The air from the air supply unit 130 is introduced into the outer pipe 112 of the double-walled pipe through an air supply line 131.

The air introduced into the outer pipe 112 of the double-walled pipe is dry air decompressed to about 5 bar, which is close to atmospheric pressure, and the air supply line 131 is provided thereon with a pressure regulation valve 132 to regulate the pressure of the air.

In addition, the air supply line 131 is provided thereon with a flow detector 133 to detect circulation of the air. When the flow detector 133 indicates that the air is being continuously supplied to the outer pipe 112, the controller 190 makes a determination that the gas handling device A is ready to operate and controls the gas supply unit 120 and the master gas valve 122 to supply the gas.

The circulated air is discharged through an air discharge line 141, wherein the air discharge line 141 is provided thereon with a gas detector 142 to detect leakage of the gas from the inner pipe 111. When the gas detector indicates that the gas is leaking from the inner pipe, a gas purging valve 182 is controlled to allow the gas to be safely discharged through the gas purging line 181 connected to the double-walled pipe 110.

The air discharge line 141 is provided with the air suction unit adapted to suction the air supplied to the outer pipe 112 toward the air discharge line 141 using a high-pressure fluid introduced thereinto via a separate line.

In the first embodiment, the air suction unit is a water ejector 151 adapted to suction the air from the outer pipe 112 using high-pressure water introduced thereinto. Specifically, the water ejector 151 converts a high-pressure and large volume of water into a low-pressure and high-speed, thereby sucking the air and creating a vacuum.

Employment of the water ejector 151 allows suction of a large amount of low-density air due to high density of the high-pressure water.

The water introduced into the water ejector 151 may be water used in a seawater cooling system provided to the ship or the offshore structure.

That is, water supplied from a sea chest S by a pump P and having been used to cool coolant water may be circulated and introduced into the water ejector 151.

The water introduced into the water ejector 151 is discharged from the ship or the offshore structure through a first discharge line 161 after passing through the water ejector 151, wherein the first discharge line 161 is formed thereon with a pressure gauge 162 to determine whether the water ejector 151 is in normal operation.

In addition, the first discharge line 161 may be provided thereon with a discharge control valve 163, such that the controller 190 can control discharge pressure through the first discharge line 161 based on a value of the discharge pressure through the first discharge line 161 measured by the pressure gauge 162.

For the ship, since a pressure of the water discharged outboard can change due to inconstant draft of the ship, it is important to regulate the discharge pressure. So, the discharge pressure through the first discharge line can be regulated to a level allowing maximum efficiency of the water ejector 151.

As described above, the air circulation system according to the first embodiment can stably operate in a simple configuration using water used in the seawater cooling system essential for the ship or the offshore structure, rather than using a fan as in the related art.

FIG. 2 is a block diagram of an air circulation system according to a second embodiment of the present invention.

Now, the air circulation system according to the second embodiment will be described with reference to FIG. 2, and description of the same components as in the first embodiment will be omitted.

In the second embodiment, the air suction unit is an air ejector 251 adapted to suction air from the outer pipe 112 using high-pressure air introduced thereinto.

The air introduced into the air ejector 251 may be supplied from a pneumatic system commonly used in ships.

That is, compressed air, which is generally compressed to about 30 bar (in the case of ships) by an air compressor AC or the like, may be introduced into the air ejector 251 after being decompressed to a level suitable for use in the air ejector 251 by a reducing unit R.

The air ejector suctions air from the outer pipe 112 of the double-walled pipe and circulates the suctioned air, and the air introduced into the air ejector 251 is discharged through a second discharge line 261, wherein the second discharge line 261 is connected to the air supply line 131 to achieve air circulation to the outer pipe without additional air supply from the air supply unit 130, thereby allowing reduction in air consumption.

In this process, surplus air is discharged through an air discharge port 262 via the second discharge line 261.

When the gas detector 142 indicates that the gas is leaking, a three-way control valve 271 is controlled to discharge the leaked gas to a safe place.

In addition, when it is detected that the gas leaks, the three-way control valve 272 at the side of the air supply unit is controlled to shut off circulation of the gas discharged from the air ejector 251 and to resume air supply to the air supply line 131 from the air supply unit 130.

As described above, the air circulation system according to the second embodiment of the present invention can stably operate in a simple configuration using compressed air generated by the pneumatic system provided to the ship or the offshore structure, rather than using a fan as in the related art.

FIG. 3 is a block diagram of an air circulation system according to a third embodiment of the present invention.

Now, the air circulation system according to the third embodiment will be described with reference to FIG. 3, and description of the same components as in the first embodiment will be omitted.

In the third embodiment, the air suction unit is a steam ejector 351 adapted to suction air from the outer pipe 112 using high-pressure steam introduced thereinto. Specifically, the steam ejector 351 converts a high-pressure and large volume of steam into a low-pressure and high-speed, thereby sucking the air and creating a vacuum.

Employment of the steam ejector 351 allows suction of a large amount of low-density air due to high density of the high-pressure steam.

The steam introduced into the steam ejector 351 may be steam produced by a steam system provided to the ship or the offshore structure.

Such a steam system is essential for ships and offshore structures and produces steam using a steam supply device 352, such as an economizer adapted to produce steam by utilizing waste heat from a boiler and an engine, and supplies the steam to on-board sites requiring heating of related devices or a heat source.

That is, the steam produced by the steam supply unit 352 is introduced into the steam ejector 351 after being adjusted to a pressure level of about 6 bar, which is suitable for the steam ejector 351, thereby allowing air circulation through the outer pipe 112.

The steam introduced into the steam ejector 351 and having passed through the steam ejector 351 may be discharged from the ship or the offshore structure through a third discharge line 362 by a three-way control valve 361 or may be supplied back to the steam supply device 352 through a condensate water circulation line 363.

That is, in an emergency such as leakage of the gas into the outer pipe, the three-way control valve 361 is controlled to discharge the steam from the ship or the offshore structure through the third discharge line 362, such that the leaked gas can be discharged together with the steam or the condensate water, thereby reducing the risk of fire.

The steam having been introduced into the steam ejector 351 under normal circumstances is supplied back to the steam supply device 352 through the condensate water circulation line 363 to be reused in the steam supply device 352, thereby allowing a resource efficient system configuration.

The condensate water circulation line 363 is branched off such that low-pressure steam is converted into condensate water through a steam trap 371 and then sent to a cascade tank 373 or such that steam is condensed into high-temperature water through a dumping condenser 372 and then sent to a cascade tank 373, wherein the condensate water stored in the cascade tank 373 may be supplied to the steam supply device 352 to be recycled.

The cascade tank 373 may be further provided with a venting line 374 through which the leaked gas is discharged from the cascade tank 373, wherein the venting line 374 is provided thereon with a gas detector 375 to immediately detect leakage of the gas.

As described above, the air circulation system according to the third embodiment of the present invention can stably operate in a simple configuration using steam produced by the steam system essential for the ship or the offshore structure, rather than using a fan as in the related art, while improving resource efficiency through recycling of used steam.

Although some embodiments of a system for circulating air through a double-walled gas supply pipe and an air circulation method using the same have been described herein, it should be understood that these embodiments are provided for illustration only and are not to be construed in any way as limiting the present invention, and that various modifications and changes can be made by those skilled in the art without departing from the spirit and scope of the invention. Therefore, the appended claims and equivalents thereof are intended to cover such changes or modifications as would fall within the scope and spirit of the present invention.

The invention claimed is:

1. A system for circulating air through a double-walled gas supply pipe, the system comprising:
 a double-walled pipe connected to a gas handling device to deliver a gas to the gas handling device, the double-walled pipe comprising an inner pipe and an outer pipe;
 a gas supply line connected to the inner pipe for supplying the gas to the gas handling device to the inner pipe;
 an air supply line connected to the outer pipe for supplying air to the outer pipe;
 a first discharge line connected to the outer pipe for discharging the air circulated from the outer pipe;
 a water ejector connected to the first discharge line and adapted to suction and circulate the air supplied to the outer pipe using water introduced thereinto:,
 a second discharge line connected to the water ejector for discharging the water introduced into the water ejector to an outside of a ship; and
 a water supply line connected to a sea chest and a cooler of the ship such that water received from the sea chest and used in the cooler is supplied to the water ejector through the water supply line.

2. The system according to claim 1, further comprising:
 a pressure gauge disposed on the first second discharge line to measure discharge pressure through the second discharge line; and
 a control valve disposed on the second discharge line and controlled based on a pressure measured by the pressure gauge.

3. A system for circulating air through a double-walled gas supply pipe, the system comprising:
 a double-walled pipe connected to a gas handling device to deliver a gas to the gas handling device, the double-walled pipe comprising an inner pipe and an outer pipe;
 a gas supply line connected to the inner pipe for supplying the gas to the gas handling device to the inner pipe;
 an air supply line connected to the outer pipe for supplying air to the outer pipe;
 a first discharge line connected to the outer pipe for discharging the air circulated from the outer pipe;
 an air ejector connected to the first discharge line and adapted to suction the air from the outer pipe using compressed air introduced thereinto: and
 a second discharge line connected to the air ejector for discharging the air introduced into the air ejector and further connected to the air supply line to allow the air discharged through the second discharge line to be circulated to the outer pipe through the air supply line.

4. The system according to claim 3, further comprising a control valve disposed on the second discharge line and configured to control air flow from the air ejector to the air supply line such that, upon detection of gas leakage into the outer pipe, air circulation from the second discharge line to the air supply line is shut off.

5. A system for circulating air through a double-walled gas supply pipe, the system comprising:
 a double-walled pipe connected to a gas handling device to deliver a gas to the gas handling device, the double-walled pipe comprising an inner pipe and an outer pipe;
 a gas supply line connected to the inner pipe for supplying the gas to the gas handling device to the inner pipe;
 an air supply line connected to the outer pipe for supplying air to the outer pipe;
 a first discharge line connected to the outer pipe for discharging the air circulated from the outer pipe; and
 a steam ejector connected to the first discharge line and adapted to suction the air from the outer pipe using steam introduced thereinto,
 the system further comprising:
  a steam supply device configured to produce the steam and supply the steam to the steam ejector;
  a condensate water circulation line branched off downstream of the steam ejector and connected to the steam supply device; and a second discharge line branched off downstream of the steam ejector to discharge the steam and the gas from a ship comprising the system.

6. The system according to claim 5, wherein, upon occurrence of gas leakage into the outer pipe, the steam introduced into the steam ejector is discharged together with the leaked gas through the second discharge line.

7. The system according to claim 5, wherein the condensate water circulation line and the second discharge line are branched off of each other via a three-way valve disposed downstream of the steam ejector, wherein the three-way valve is configured to control the steam to flow to the condensate water circulation line or the second discharge line.

8. The system according to claim 6, wherein the steam introduced into the steam ejector is converted into condensate water and sent to a cascade tank through the condensate water circulation line to be temporarily stored in the cascade tank, and the cascade tank is formed with a venting line through which the leaked gas is discharged.

9. The system according to claim 6, further comprising:
a gas detector disposed on the first discharge line to detect leakage of the gas.

10. A method of circulating air through a double-walled gas supply pipe, comprising:
supplying, through an air supply line, air to an outer pipe of the double-walled gas supply pipe;
suctioning, by an air ejector, the air in the outer pipe toward a first discharge line through introduction of compressed air into the air ejector;
discharging the air introduced into the air ejector through a second discharge line; and
circulating the air discharged through the second discharge line to the outer pipe,
wherein air circulation to the outer pipe is achieved without additional air supply by circulating the air introduced into the air ejector and having been discharged through the second discharge line to the outer pipe.

11. The method according to claim 10, further comprising upon detection of gas leakage into the outer pipe, shutting off air circulation from the second discharge line to the outer pipe while controlling air supply through the air supply line to resume air supply to the outer pipe.

12. A method of circulating air through a double-walled gas supply pipe, comprising:
supplying, through an air supply line, air to an outer pipe of the double-walled gas supply pipe;
suctioning, by a steam ejector, the air in the outer pipe toward a first discharge line through introduction of steam into the steam ejector;
discharging the steam introduced into the steam ejector; and
controlling the steam introduced into the steam ejector to be discharged to a condensate water circulation line or a second discharge line, wherein upon occurrence of gas leakage into the outer pipe, the steam introduced into the steam ejector is discharged together with leaked gas to an outside of a ship or an offshore structure via the second discharge line.

13. The method according to claim 12, wherein the steam introduced into the steam ejector is produced by a steam supply device provided to the ship or the offshore structure.

14. The method according to claim 13, further comprising:
converting the steam discharged from the steam ejector into condensate water; and
supplying the condensate water back to the steam supply device.

15. The method according to claim 14, further comprising:
temporarily storing the condensate water in a cascade tank,
wherein the cascade tank is formed with a venting line through which the leaked gas is discharged.

* * * * *